United States Patent [19]
Van Hook et al.

[11] Patent Number: 5,734,874
[45] Date of Patent: Mar. 31, 1998

[54] CENTRAL PROCESSING UNIT WITH INTEGRATED GRAPHICS FUNCTIONS

[75] Inventors: Timothy J. Van Hook, Menlo Park; Leslie Dean Kohn; Robert Yung, both of Fremont, all of Calif.

[73] Assignee: Sun Microsystems, Inc., Mountain View, Calif.

[21] Appl. No.: 236,572

[22] Filed: Apr. 29, 1994

[51] Int. Cl.$^6$ .................................................. G06F 12/00
[52] U.S. Cl. .......................... 395/513; 395/800; 395/563; 395/562; 395/564; 395/565; 395/523; 395/524
[58] Field of Search ................................. 395/121, 122, 395/127, 138, 139, 162–166, 375, 800, 775, 501, 513, 561–566, 523, 524

[56] References Cited

U.S. PATENT DOCUMENTS

| | | | |
|---|---|---|---|
| 4,965,752 | 10/1990 | Keith | 395/127 |
| 5,081,698 | 1/1992 | Kohn | 395/122 |
| 5,157,388 | 10/1992 | Kohn | 395/162 |
| 5,268,995 | 12/1993 | Diefendorff et al. | 395/162 |

FOREIGN PATENT DOCUMENTS

| | | | |
|---|---|---|---|
| 0 395 348 A3 | 10/1990 | European Pat. Off. | G06F 9/30 |
| 0 380 098 A3 | 8/1991 | European Pat. Off. | G06F 15/80 |
| 2 265 065 | 9/1993 | United Kingdom | G06F 15/70 |
| WO 94/08287 | 4/1984 | WIPO | G06F 9/38 |

OTHER PUBLICATIONS

MC 88110, User's Manual, 1991 pp. 1–4 to 1–17; 3–1 to 3–15; 5–1 to 5–25; 7–9; 7–14; 7–15; 7–19; 7–20; 7–21.

*Primary Examiner*—Kee M. Tung
*Attorney, Agent, or Firm*—Townsend and Townsend and Crew LLP

[57] ABSTRACT

A central processing unit (CPU) is provided with a graphics execution unit (GRU), including a graphics status register (GSR), for executing a number of graphics operations in accordance to a graphics data scaling factor and an alignment address offset stored in the GSR, the graphics data having a number of graphics data formats. In one embodiment, the GRU is also used to execute a number of graphics data addition, subtraction, rounding, expansion, merge, alignment, multiplication, logical, compare, and pixel distance operations. The graphics data operations are categorized into a first and a second category, and the GRU concurrently executes one graphics operations from each category. Furthermore, under this embodiment, the integer execution unit of the CPU is also used to execute a number of graphics data edge handling and 3-D array addressing operations, while the load and store unit (LSU) of the CPU is also used to execute a number of graphics data load and store operations, including conditional store operations.

15 Claims, 20 Drawing Sheets

| GRAPHIC INSTRUCTION GROUP | GRAPHIC INSTRUCTIONS |
|---|---|
| 200 — GSR | RDASR, WRASR |
| 202 — PARTITIONED ADD/SUBTRACT | FPADD, FPSUB |
| 204 — GRAPHICS DATA ALIGNMENT | ALIGNADDRESS, ALIGNDATA |
| 206 — PIXEL DISTANCE | PDIST |
| 208 — PARTITIONED MULTIPLICATION | FPMULT |
| 210 — PARTITIONED EXPAND & MERGE | FPEXPAND, FPMERGE |
| 212 — PARTITIONED PACK | FPPACK |
| 214 — LOGICAL | FZERO, FONE, FSRC, FNOT, FOR, FAND, FNAND, ETC. |
| 216 — COMPARE | FPCMP |
| 218 — EDGE HANDLING | EDGE |
| 220 — 3-D ARRAY ACCESS | ARRAY |
| 222 — MEMORY ACCESS | PST, SLD/SST, BLD/BST |

*Figure 6c* op = 10 , op3 = 110110

| | opcode | op3 | operation |
|---|---|---|---|
| 98a | ALIGNADDRESS | 000011000 | calculate address for misaligned data access |
| 98b | ALIGNADDRESS1_LITTLE | 000011010 | calculate address for misaligned data access, little endian |
| 100 | FALIGNDATA | 001001000 | performs data alignment for misaligned data |

| Exemplary Assembly Language Syntax | |
|---|---|
| alignaddr | reg$_{rs1}$, reg$_{rs2}$, reg$_{rd}$ |
| alignaddrl | reg$_{rs1}$, reg$_{rs2}$, reg$_{rd}$ |
| faligndata | freg$_{rs1}$, freg$_{rs2}$, freg$_{rd}$ |

*Figure 7a*

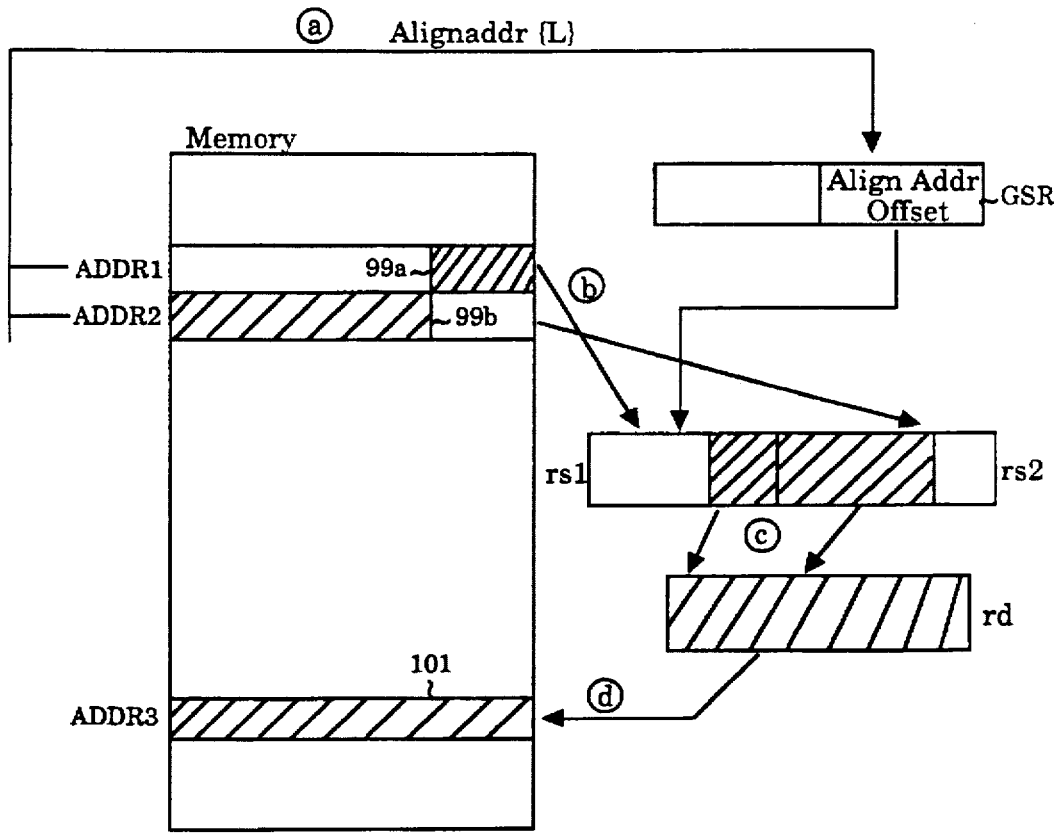

*Figure 7b* op = 10 , op3 = 110110

| opcode | opf | operation |
|---|---|---|
| 138 — PDIST | 000111110 | distance between 8 8-bit components |

| Exemplary Assembly Language Syntax | |
|---|---|
| pdist | freg$_{rs1}$, freg$_{rs2}$, freg$_{rd}$ |

*Figure 9a* op = 10 , op3 = 110110

| | opcode | opf | operation |
|---|---|---|---|
| 140a | EDGE8 | 000000000 | 8 8-bit edge boundary processing |
| 140b | EDGE8L | 000000010 | 8 8-bit edge boundary processing, little endian |
| 140c | EDGE16 | 000000100 | 4 16-bit edge boundary processing |
| 140d | EDGE16L | 000000110 | 4 16-bit edge boundary processing, little endian |
| 140e | EDGE32 | 000001000 | 2 32-bit edge boundary processing |
| 140f | EDGE32L | 000001010 | 2 32-bit edge boundary processing, little endian |

| Exemplary Assembly Language Syntax | |
|---|---|
| edge8 | $reg_{rs1}$, $reg_{rs2}$, $reg_{rd}$ |
| edge8l | $reg_{rs1}$, $reg_{rs2}$, $reg_{rd}$ |
| edge16 | $reg_{rs1}$, $reg_{rs2}$, $reg_{rd}$ |
| edge16l | $reg_{rs1}$, $reg_{rs2}$, $reg_{rd}$ |
| edge32 | $reg_{rs1}$, $reg_{rs2}$, $reg_{rd}$ |
| edge32l | $reg_{rs1}$, $reg_{rs2}$, $reg_{rd}$ |

*Figure 10a*

BIG ENDIAN

| Edge Size | LSB | Left Edge | Right Edge |
|---|---|---|---|
| 8 | 000 | 11111111 | 10000000 |
| 8 | 001 | 01111111 | 11000000 |
| 8 | 010 | 00111111 | 11100000 |
| 8 | 011 | 00011111 | 11110000 |
| 8 | 100 | 00001111 | 11111000 |
| 8 | 101 | 00000111 | 11111100 |
| 8 | 110 | 00000011 | 11111110 |
| 8 | 111 | 00000001 | 11111111 |
| 16 | 00x | 1111 | 1000 |
| 16 | 01x | 0111 | 1100 |
| 16 | 10x | 0011 | 1110 |
| 16 | 11x | 0001 | 1111 |
| 32 | 0xx | 11 | 10 |
| 32 | 1xx | 01 | 11 |

LITTLE ENDIAN

| Edge Size | LSB | Left Edge | Right Edge |
|---|---|---|---|
| 8 | 000 | 11111111 | 00000001 |
| 8 | 001 | 11111110 | 00000011 |
| 8 | 010 | 11111100 | 00000111 |
| 8 | 011 | 11111000 | 00001111 |
| 8 | 100 | 11110000 | 00011111 |
| 8 | 101 | 11100000 | 00111111 |
| 8 | 110 | 11000000 | 01111111 |
| 8 | 111 | 10000000 | 11111111 |
| 16 | 00x | 1111 | 0001 |
| 16 | 01x | 1110 | 0011 |
| 16 | 10x | 1100 | 0111 |
| 16 | 11x | 1000 | 1111 |
| 32 | 0xx | 11 | 01 |
| 32 | 1xx | 10 | 11 |

*Figure 10b* op = 10 , op3 - 110110

| | opcode | opf | operation |
|---|---|---|---|
| 142a | ARRAY8 | 000010010 | convert 8-bit 3-D address to blocked byte address |
| 142b | ARRAY16 | 000010010 | convert 16-bit 3-D address to blocked byte address |
| 142c | ARRAY32 | 000010010 | convert 32-bit 3-D address to blocked byte address |

| rs2 value | number of elements | rs2 value | number of elements |
|---|---|---|---|
| 0 | 64 | 3 | 512 |
| 1 | 128 | 4 | 1024 |
| 2 | 256 | 5 | 2048 | rs1: | z integer | z fraction | y integer | y fraction | x integer | x fraction |
63          55 54         44 43        33 32        22 21        11 10        0

8 bits:

| upper | | | middle | | | lower | | |
|---|---|---|---|---|---|---|---|---|
| Z | Y | X | Z | Y | X | Z | Y | X |

20        17        17        17    13   9    5   4  2   0
+ 2 rs2  + 2 rs2   + rs2

16 bits:

| upper | | | middle | | | lower | | | 0 |
|---|---|---|---|---|---|---|---|---|---|
| Z | Y | X | Z | Y | X | Z | Y | X | |

21        18        18        18    14  10   6   5  3  1   0
+ 2 rs2  + 2 rs2   + rs2

32 bits:

| upper | | | middle | | | lower | | | 00 |
|---|---|---|---|---|---|---|---|---|---|
| Z | Y | X | Z | Y | X | Z | Y | X | |

22        19        19        19    15  11   7   6  4  2   0
+ 2 rs2  + 2 rs2   + rs2

| Exemplary Assembly Language Syntax | |
|---|---|
| array8 | reg$_{rs1}$, reg$_{rs2}$, reg$_{rd}$ |
| array16 | reg$_{rs1}$, reg$_{rs2}$, reg$_{rd}$ |
| array32 | reg$_{rs1}$, reg$_{rs2}$, reg$_{rd}$ |

*Figure 11a*

CENTRAL PROCESSING UNIT WITH INTEGRATED GRAPHICS FUNCTIONS

BACKGROUND OF THE INVENTION

1. Field of the Invention

The present invention relates to the field of computer systems. More specifically, the present invention relates to a cost effective, high performance central processing unit (CPU) having integrated graphics capabilities.

2. Background

There are three major barriers to achieving high performance in graphics computer systems. The first barrier is in floating point processing throughput. Graphics applications typically perform large amount of figure manipulation operations such as transformations and clippings using floating point data. The second barrier is in integer or fixed point processing throughput. Graphics applications also typically perform large amount of display operations such as scan conversion and color interpolation using integer or fixed point data. The third barrier is in memory references. The above described operations typically require large amount of memory references for reading from and writing into for example the frame and Z-buffers.

Historically, the CPUs in early prior art computer systems are responsible for both graphics as well as non-graphics functions. No special hardware are provided to assist these early CPUs in performing the large amount of floating and fixed point processing, nor memory references. While the designs of these early prior art computer systems are simple, their performance are typically slow.

Some later prior art computer systems provide auxiliary display processors. The auxiliary display processors would off load these later CPUs from some of the display related operations. However, these later CPUs would still be responsible for most of the graphics processing. Typically, the bandwidth of the system buses of these later prior art computer systems are increased correspondingly to accommodate the increased amount of communications between the processors over the buses. The auxiliary display processors may even be provided with their own memory to reduce the amount of memory contentions between the processors. While generally performance will increase, however, the approach is costly and complex.

Other later prior art computer systems would provide auxiliary graphics processors with even richer graphics functions. The auxiliary graphics processors would off load the CPUs of these later prior art computer systems from most of the graphics processing. Under this approach extensive dedicated hardware as well as sophisticated software interface between the CPUs and the auxiliary graphics processors will have to be provided. While performance will increase even more, however, the approach is even more costly and more complex than the display processor approach.

In the case of microprocessors, as the technology continues to allow more and more circuitry to be packaged in a small area, it is increasingly more desirable to integrate the general purpose CPU with built-in graphics capabilities instead. Some modern prior art computer systems have begun to do that. However, the amount and nature of graphics functions integrated in these modern prior art computer systems typically are still very limited. Particular graphics functions known to have been integrated include only frame buffer checks, add with pixel merge, and add with z-buffer merge. Much of the graphics processing on these modern prior art systems remain being processed by the general purpose CPU without additional built-in graphics capabilities, or by the auxiliary display/graphics processors.

As will be disclosed, the present invention provides a cost effective, high performance CPU with integrated native graphics capabilities that advantageously overcomes much of these performance barriers and achieves the above described and other desired results.

SUMMARY OF THE INVENTION

Under the present invention, the desired results are advantageously achieved by providing a graphics execution unit (GRU) to the central processing unit (CPU). The GRU comprises a graphics status register (GSR) and at least one partitioned execution path. The GSR is used to store a graphics data scaling factor and a graphics data alignment address offset. The at least one partitioned execution path is used to execute a number of graphics operations on graphics data having a number of graphics data formats. Some of these graphic operations are partitioned operations operating simultaneously on multiple components of graphics data, including graphics operations operating in accordance to the graphics data scaling factor and alignment address offset.

In one embodiment, the GRU comprises a first and a second partitioned execution path. The two execution paths are independent of each other. The first partitioned execution path is used to independently execute a number of partitioned addition and subtraction, expansion, merge, and logical operations on graphics data, and a number of alignment operations on graphics data using the alignment address offset. The second partitioned execution path is used to independently execute a number of partitioned multiplication, a number of pixel distance computation, and compare operations on graphics data, and a number of data packing operations on graphics data using the scaling factor.

Additionally, under this embodiment, the integer execution unit (IEU) of the CPU is used to execute a number of edge handling operations on graphics data addresses, and enhanced with additional circuitry for 3-D array address conversions, while the load and store unit (LSU) of the CPU is also used to execute a number of graphics data load and store operations, including partial conditional store operations.

BRIEF DESCRIPTION OF THE DRAWINGS

FIGS. 6a–6c illustrate the graphics data formats, the graphics instruction formats, and the graphic instruction groups in further detail.

FIGS. 7a–7c illustrate the graphics data alignment instructions and circuitry in further detail.

FIGS. 9a–9b illustrate the graphics data pixel distance computation instruction and circuitry in further detail.

FIGS. 10a–10b illustrate the graphics data edge handling instructions in further detail.

FIGS. 11a–11b illustrate the graphics data 3-D array addressing instructions and circuitry in further detail.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
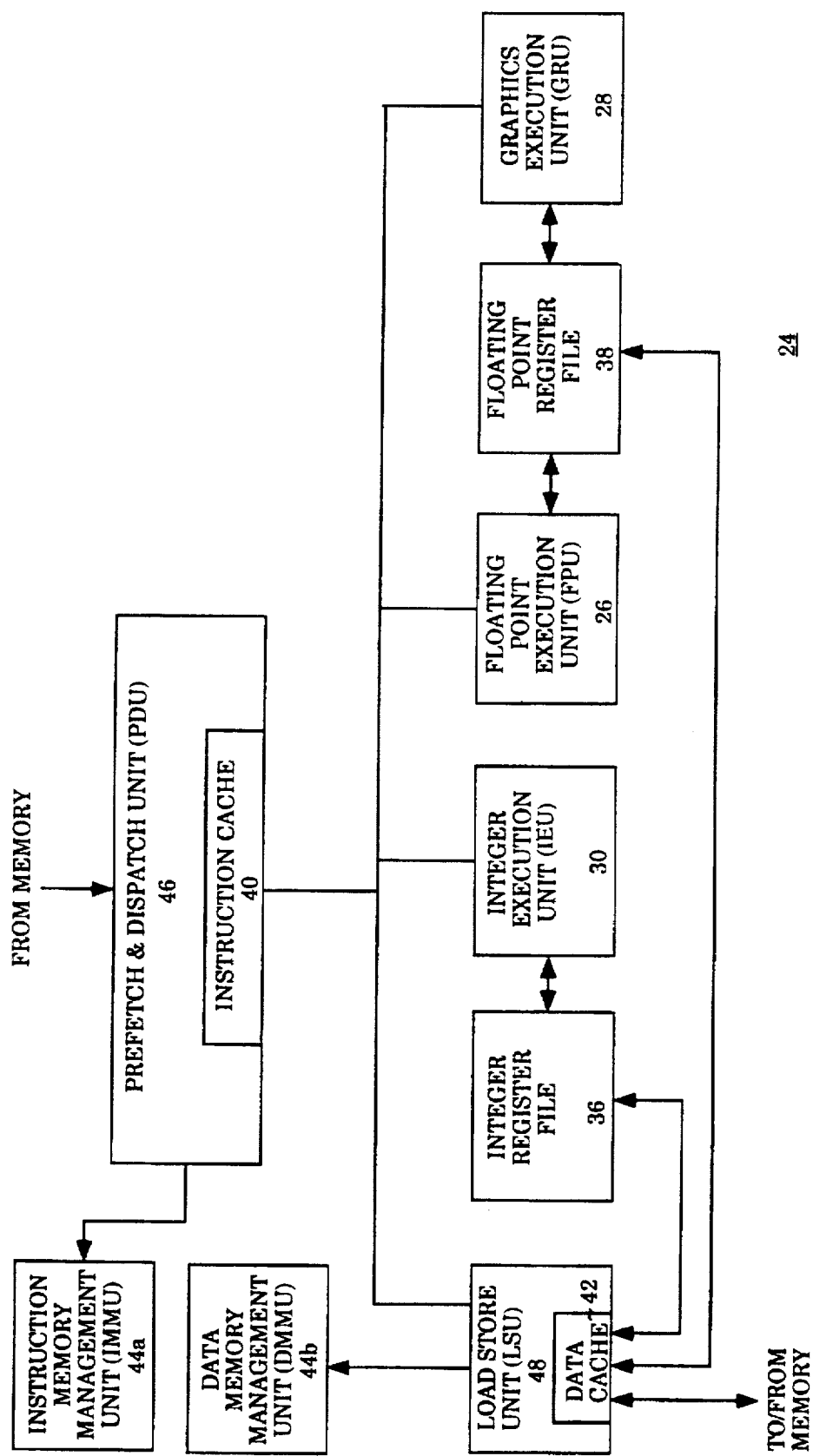
FIG. 1 illustrates the CPU of an exemplary graphics computer system incorporating the teachings of the present invention.

Referring now to FIG. 1, a block diagram illustrating the CPU of an exemplary graphics computer system incorporating the teachings of the present invention is shown. As illustrated, the CPU 24 comprises a prefetch and dispatch unit (PDU) 46 including an instruction cache 40, an integer execution unit (IEU) 30, an integer register file 36, a floating point unit (FPU) 26, a floating point register file 38, and a graphics execution unit (GRU) 28, coupled to each other as shown. Additionally, the CPU 24 comprises two memory management units (IMMU & DMMU) 44a–44b, and a load and store unit (LSU) 48 including a data cache 42, coupled to each other and the previously described elements as shown. Together they fetch, dispatch, execute, and save execution results of instructions, including graphics instructions, in a pipelined manner.

The PDU 46 fetches instructions from memory and dispatches them to the IEU 30, the FPU 26, the GRU 28, and the LSU 48 accordingly. Prefetched instructions are stored in the instruction cache 40. The IEU 30, the FPU 26, and the GRU 28 perform integer, floating point, and graphics operations respectively. In general, the integer operands/results are stored in the integer register file 36, whereas the floating point and graphics operands/results are stored in the floating point register file 38. Additionally, the IEU 30 also performs a number of graphics operations, and appends address space identifiers (ASI) to addresses of load/store instructions for the LSU 48, identifying the address spaces being accessed. The LSU 48 generates addresses for all load and store operations. The LSU 48 also supports a number of load and store operations, specifically designed for graphics data. Memory references are made in virtual addresses. The MMUs 44a–44b map virtual addresses to physical addresses.

There are many variations to how the PDU 46, the IEU 30, the FPU 26, the integer and floating point register files 36 and 38, the MMUs 44a–44b, and the LSU 48, are coupled to each other. In some variations, some of these elements 46, 30, 26, 36, 38, 44a–44b, and 48, may be combined, while in other variations, some of these elements 46, 30, 26, 36, 38, 44a–44b, and 48, may perform other functions. Thus, except for the incorporated teachings of the present invention, these elements 46, 30, 26, 36, 38, 44a–44b, and 48, are intended to represent a broad category of PDUs, IEUs, FPUs, integer and floating point register files, MMUs, and LSUs, found in many graphics and nongraphics CPUs. Their constitutions and functions are well known and will not be otherwise described further. The teachings of the present invention incorporated in these elements 46, 30, 26, 36, 38, 44a–44b, and 48, and the GRU 28 will be described in further detail below.

Figure 2:
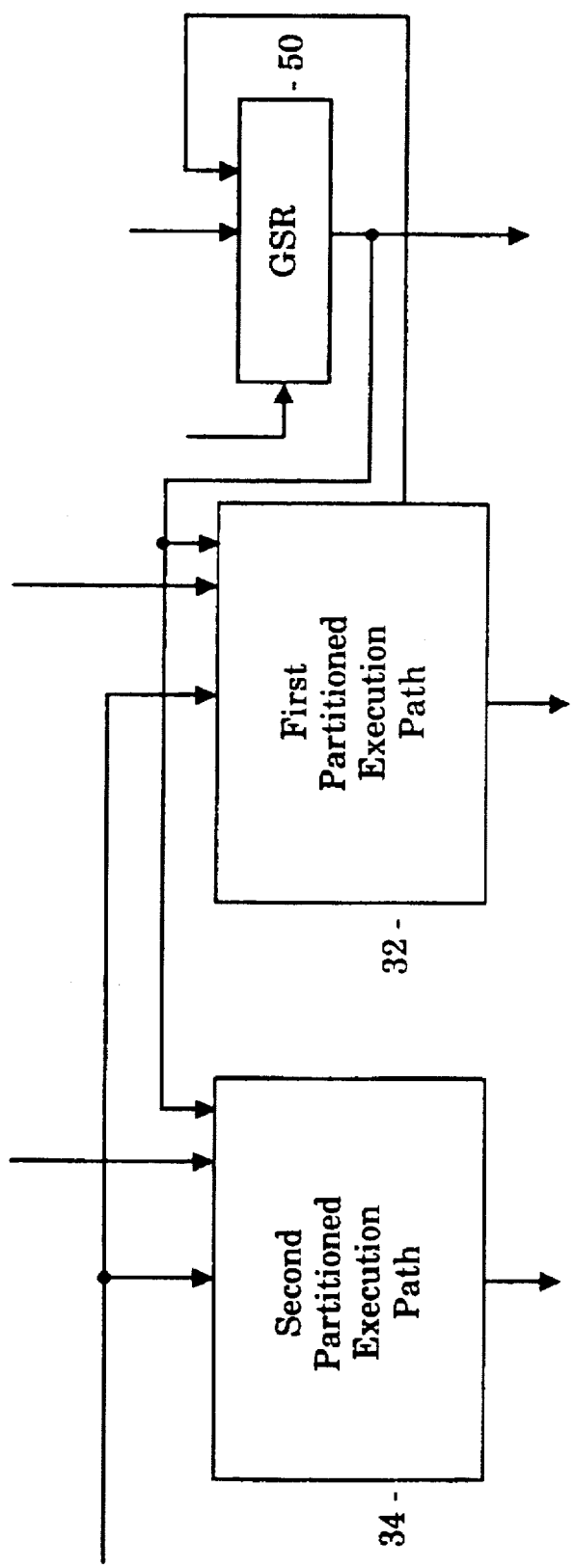
FIG. 2 illustrates the relevant portions of one embodiment of the Graphics Execution Unit (GRU) in further detail.

Referring now to FIG. 2, a block diagram illustrating the relevant portions of one embodiment of the GRU in further detail is shown. In this embodiment, the GRU 28 comprises a graphics status register (GSR) 50, a first and a second partitioned execution path 32 and 34. The two execution paths 32 and 34 are independent of each other. In other words, two graphics instructions can be independently issued into the two execution paths 32 and 34 at the same time. Together, they independently execute the graphics instructions, operating on graphics data. The functions and constitutions of these elements 50, 32 and 34 will be described in further detail below with additional references to the remaining figures.

Figure 3:
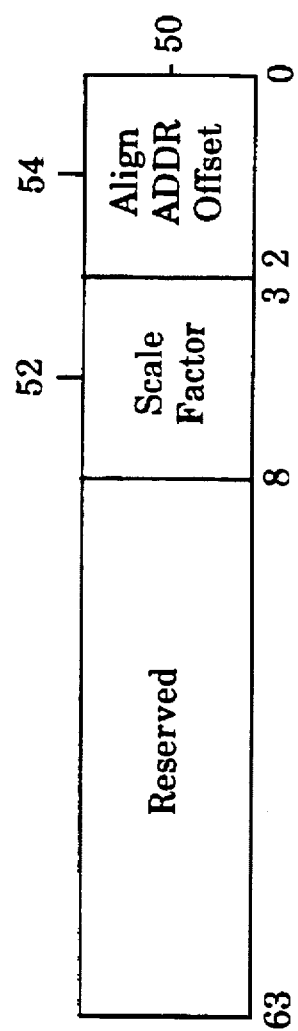
FIG. 3 illustrates the Graphics Status Register (GSR) of the GRU in further detail.

Referring now to FIG. 3, a diagram illustrating the relevant portions of one embodiment of the graphics status register (GSR) is shown. In this embodiment, the GSR 50 is used to store the least significant three bits of a pixel address before alignment (alignaddr_offset) 54, and a scaling factor to be used for pixel formatting (scale_factor) 52. The alignaddr_offset 54 is stored in bits GSR[2:0], and the scale_factor 52 is stored in bits GSR[6:3]. As will be described in more detail below, two special instructions RDASR and WRASR are provided for reading from and writing into the GSR 50. The RDASR and WRASR instructions, and the usage of alignaddr_offset 54 and scale_factor 52 will be described in further detail below.

Figure 4:
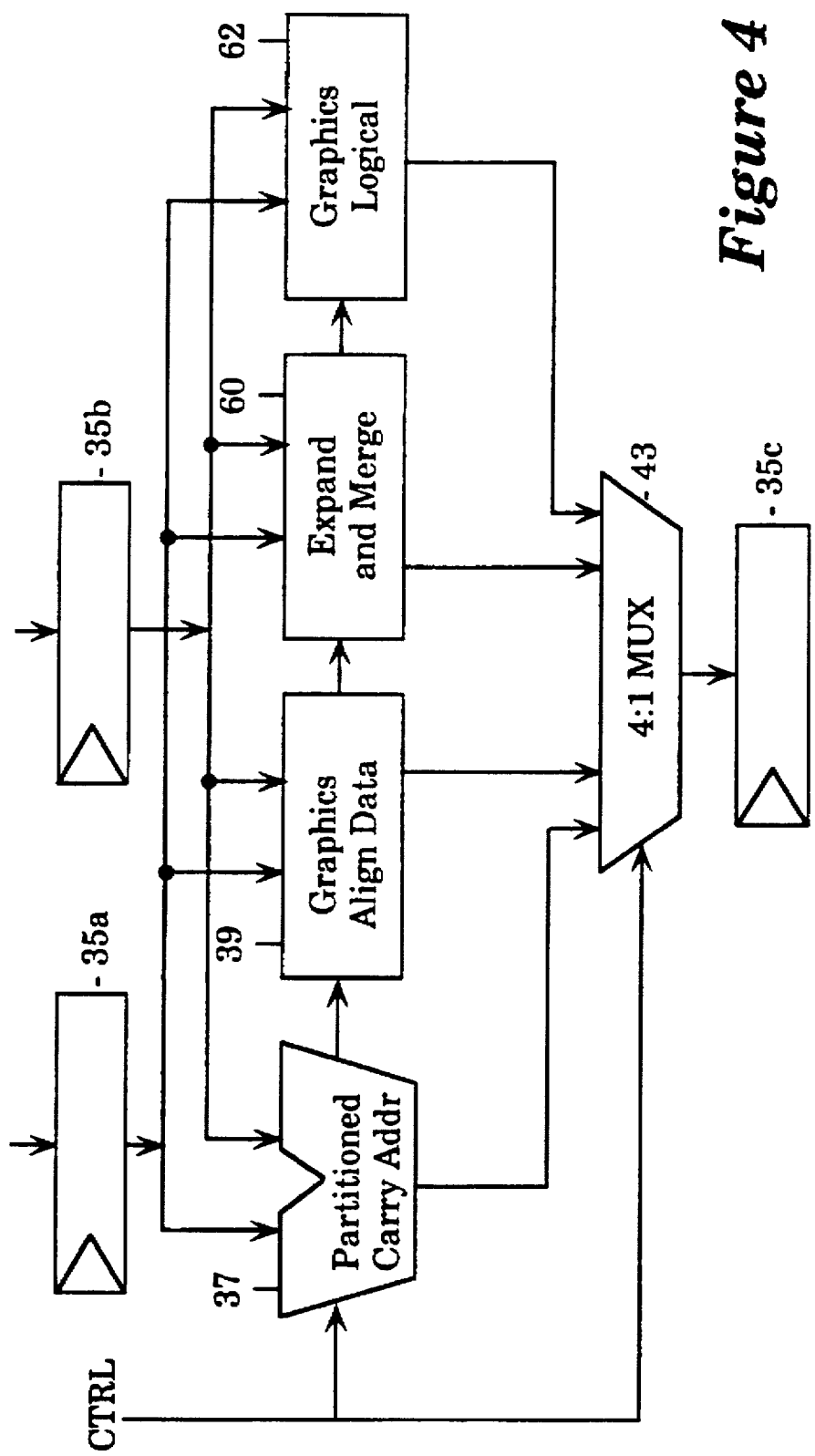
FIG. 4 illustrates the first partitioned execution path of the GRU in further detail.

Referring now to FIG. 4, a block diagram illustrating the relevant portions of one embodiment of the first partitioned execution path is shown. The first partitioned execution path 32 comprises a partitioned carry adder 37, a graphics data alignment circuit 39, a graphics data expand/merge circuit 60, and a graphics data logical operation circuitry 62, coupled to each other as shown. Additionally, the first partitioned execution path 32 further comprises a number of registers 35a–35b, and a 4:1 multiplexor 43, coupled to each other and the previously described elements as shown. At each dispatch, the PDU 46 may dispatch either a graphics data partitioned add/subtract instruction, a graphics data alignment instruction, a graphics data expand/merge instruction or a graphics data logical operation to the first partitioned execution path 32. The partitioned carry adder 37 executes the partitioned graphics data add/subtract instructions, and the graphics data alignment circuit 39 executes the graphics data alignment instruction using the alignaddr_offset stored in the GSR 50. The graphics data expand/merge circuit 60 executes the graphics data merge/expand instructions. The graphics data logical operation circuit 62 executes the graphics data logical operations.

The functions and constitutions of the partitioned carry adder 37 are similar to simple carry adders found in many integer execution units known in the art, except the hardware are replicated multiple times to allow multiple additions/subtractions to be performed simultaneously on different partitioned portions of the operands. Additionally, the carry chain can be broken into two 16-bit chains. Thus, the partitioned carry adder 37 will not be further described.

Similarly, the functions and constitutions of the graphics data expand/merge circuit 60, and the graphics data logical operation circuit 62 are similar to expand/merge and logical operation circuits found in many integer execution units known in the art, except the hardware are replicated multiple times to allow multiple expand/merge and logical operations to be performed simultaneously on different partitioned portions of the operands. Thus, the graphics data expand/merge circuit 60, and the graphics data logical operation circuit 62 will also not be further described.

The graphics data partitioned add/subtract and the graphics data alignment instructions, and the graphics data alignment circuit 39 will be described in further detail below.

Figure 5:
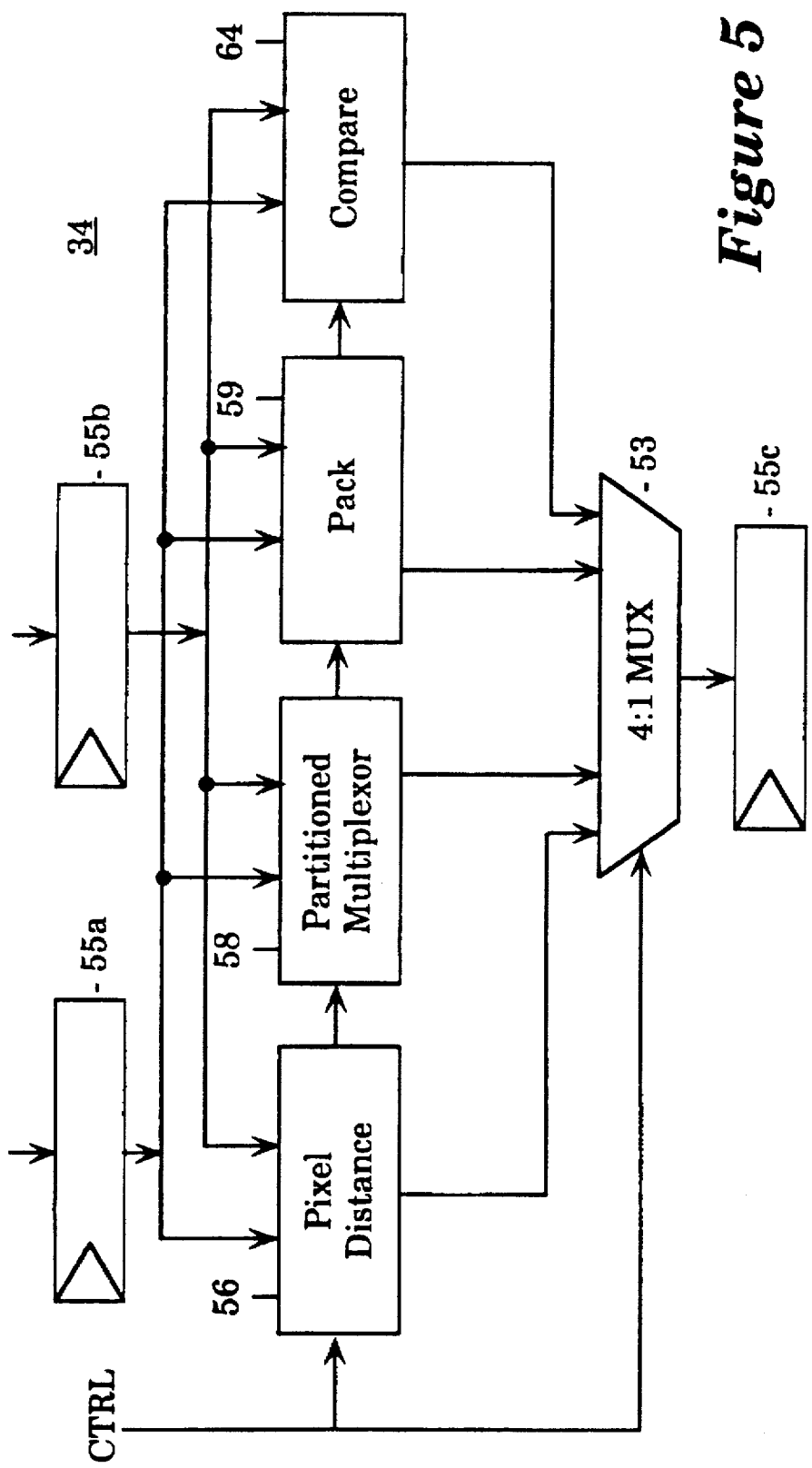
FIG. 5 illustrates the second partitioned execution path of the GRU in further detail.

Referring now to FIG. 5, a block diagram illustrating the relevant portion of one embodiment of the second partitioned execution path in further detail is shown. In this embodiment, the second partitioned execution path 34 comprises a pixel distance computation circuit 36, a partitioned multiplier 58, a graphics data packing circuit 59, and a graphics data compare circuit 64, coupled to each other as shown. Additionally, the second partitioned execution path 34 further comprises a number of registers 55a–55c, a 4:1 multiplexor 53, coupled to each other and the previously described elements as shown. At each dispatch, the PDU 46 may dispatch either a pixel distance computation instruction, a graphics data partitioned multiplication instruction, a graphics data packing instruction, or a graphics data compare instruction to the second partitioned execution path 34. The pixel distance computation circuit 56 executes the pixel distance computation instruction. The partitioned multiplier 58 executes the graphics data partitioned multiplication instructions. The graphics data packing circuit 59 executes the graphics data packing instructions. The graphics data compare circuit 64 executes the graphics data compare instructions.

The functions and constitutions of the partitioned multiplier 58, and the graphics data compare circuit 64 are similar to simple multipliers, and compare circuits found in many integer execution units known in the art, except the hardware are replicated multiple times to allow multiple multiplications and comparison operations to be performed simultaneously on different partitioned portions of the operands. Additionally, multiple multiplexors are provided to the partitioned multiplier for rounding, and comparison masks are generated by the comparison circuit 64. Thus, the partitioned multiplier 58, and the graphics data compare circuit 64 will not be further described.

The pixel distance computation, graphics data partitioned multiplication, graphics data pack/expand/merge, graphics data logical operation, and graphics data compare instructions, the pixel distance circuit 56, and the graphics data pack circuit 59 will be described in further detail below.

While the present invention is being described with an embodiment of the GRU 28 having two independent partitioned execution paths, and a particular allocation of graphics instruction execution responsibilities among the execution paths, based on the descriptions to follow, it will be appreciated that the present invention may be practiced with one or more independent partitioned execution paths, and the graphics instruction execution responsibilities allocated in any number of manners.

Figure 6A:
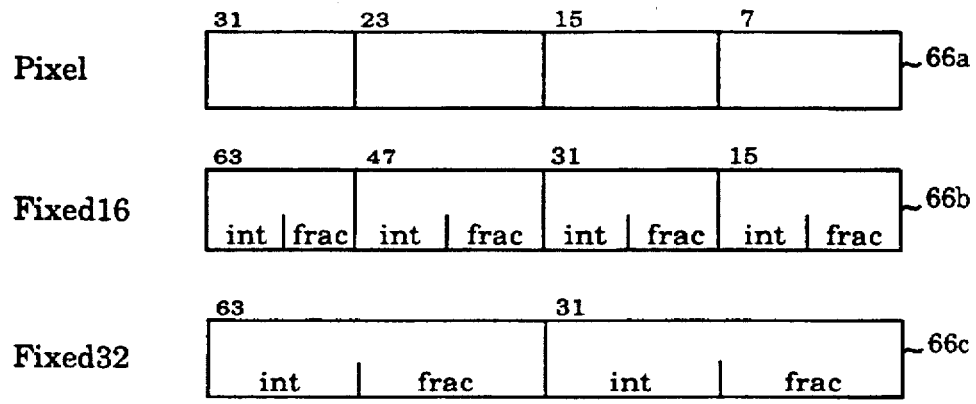
Figure 6B:
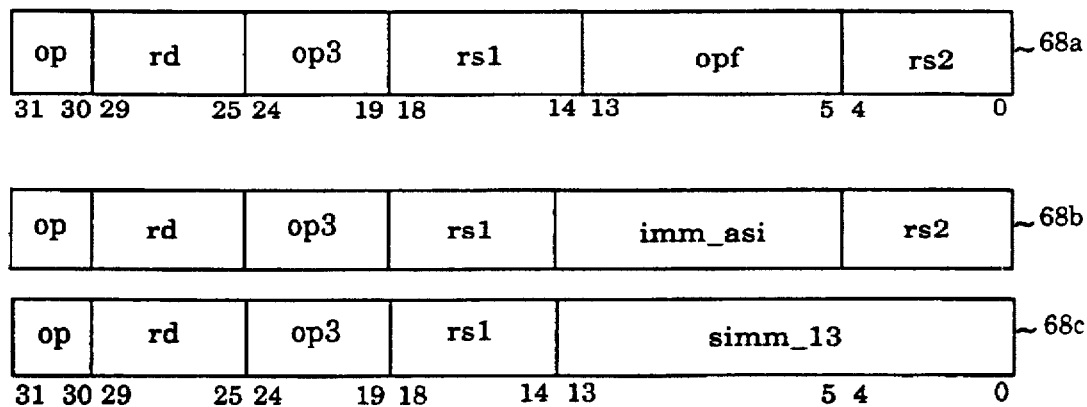

Referring now to FIGS. 6a–6c, three diagrams illustrating the graphics data formats, the graphics instruction formats, and the graphics instructions are shown. As illustrated in FIG. 6a, the exemplary CPU 24 supports three graphics data formats, an eight bit format (Pixel) 66a, a 16 bit format (Fixed16) 66b, and a 32 bit format (Fixed32) 66c. Thus, four pixel formatted graphics data are stored in a 32-bit word, 66a whereas either four Fixed16 or two Fixed32 formatted graphics data are stored in a 64-bit word 66b or 66c. Image components are stored in either the Pixel or the Fixed16 format 66a or 66b. Intermediate results are stored in either the Fixed16 or the Fixed32 format 66b or 66c. Typically, the intensity values of a pixel of an image, e.g. the alpha, green, blue, and red values (α, G, B, R), are stored in the Pixel format 66a. These intensity values may be stored in band interleaved where the various color components of a point in the image are stored together, or band sequential where all of the values for one component are stored together. The Fixed16 and Fixed32 formats 66b–66c provide enough precision and dynamic range for storing intermediate data computed during filtering and other simple image manipulation operations performed on pixel data. Graphics data format conversions are performed using the graphics data pack, expand, merge, and multiply instructions described below.

As illustrated in FIG. 6b, the CPU 24 supports three graphics instruction formats 68a–68c. Regardless of the instruction format 68a–68c, the two most significant bits [31:30] 70a–70c provide the primary instruction format identification, and bits[24:19] 74a–74c provide the secondary instruction format identification for the graphics instructions. Additionally, bits[29:25] (rd) 72a–72c identify the destination (third source) register of a graphics (block/partial conditional store) instruction, whereas, bits [18:14] (rs1) 76a–76c identify the first source register of the graphics instruction. For the first graphics instruction format 68a, bits[13:5] (opf) and bits[4:0] (rs2) 80 and 82a identify the op codes and the second source registers for a graphics instruction of the format. For the second and third graphics instruction formats 68b–68c, bits[13:5] (imm_asi) and bits [13:0] (simm_13) may optionally identify the ASI. Lastly, for the second graphics instruction format 68b, bits[4:0] (rs2) further provide the second source register for a graphics instruction of the format (or a mask for a partial conditional store).

As illustrated in FIG. 6c, the CPU 24 supports a number of GSR related instructions 200, a number of partitioned add/subtract/multiplication instructions 202 and 208, a number of graphics data alignment instructions 204, a number of pixel distance computation instructions 206, a number of graphics data pack/expand/merge instructions 210 and 212, a number of graphics data logical and compare instructions 214 and 216, a number of edge handling and 3-D array access instructions 218 and 220, and a number of memory access instructions 222.

The GSR related instructions 200 include a RDASR and a WRASR instruction for reading and writing the alignaddr_offset and the scale_factor from and into the GSR 50. The RDASR and WRASR instructions are executed by the IEU 30. The RDASR and WRASR instructions are similar to other CPU control register read/write instructions, thus will not be further described.

The graphics data partitioned add/subtract instructions 202 include four partitioned graphics data addition instructions and four partitioned graphics data subtraction instructions for simultaneously adding and subtracting four 16-bit, two 16-bit, two 32-bit, and one 32-bit graphics data respectively. These instructions add or subtract the corresponding fixed point values in the rs1 and rs2 registers, and correspondingly place the results in the rd register. As described earlier, the graphics data partitioned add/subtract instructions 202 are executed by the partitioned carry adder 37 in the first independent execution path 32 of the GRU 28.

The graphics data partitioned multiplication instructions 208 include seven partitioned graphics data multiplication instructions for simultaneously multiplying either two or four 8-bit graphics data with another two or four corresponding 16-bit graphics data. A FMUL8x16 instruction multiplies four 8-bit graphics data in the rs1 register by four corresponding 16-bit graphics data in the rs2 register. For each product, the upper 16 bits are stored in the corresponding positions of the rd register. A FMUL8x16AU and a FMUL8x16AL instruction multiplies the four 8-bit graphics data in the rs1 register by the upper and the lower halves of the 32-bit graphics data in the rs2 register respectively.

Similarly, for each product, the upper 16 bits are stored in the corresponding positions of the rd register.

A FMUL8SUx16 instruction multiplies the four upper 8-bits of the four 16-bit graphics data in the rs1 register by the four corresponding 16-bit graphics data in the rs2 register. Likewise, for each product, the upper 16 bits are stored in the corresponding positions of the rd register. A FMUL8ULx16 instruction multiplies the four lower 8-bits of the four 16-bit graphics data in the rs1 register by the four corresponding 16-bit graphics data in the rs2 register. For each product, the sign extended upper 8 bits are stored in the corresponding positions of the rd register.

A FMULD8SUx16 instruction multiplies the two upper 8-bits of the two 16-bit graphics data in the rs1 register by the two corresponding 16-bit graphics data in the rs2 register. For each product, the 24 bits are appended with 8-bit of zeroes and stored in the corresponding positions of the rd register. A FMULD8ULx16 instruction multiplies the two lower 8-bits of the two 16-bit graphics data in the rs1 register by the two corresponding 16-bit graphics data in the rs2 register. For each product, the 24 bits are sign extended and stored in the corresponding positions of the rd register.

As described earlier, the graphics data partitioned multiplication instructions 208 are executed by the partitioned multiplier 58 in the second independent execution path 34 of the GRU 28.

The graphics data expand and merge instructions 210 include a graphics data expansion instruction, and a graphics data merge instruction, for simultaneously expanding four 8-bit graphics data into four 16-bit graphics data, and interleavingly merging eight 8-bit graphics data into four 16-bit graphics data respectively. A FEXPAND instruction takes four 8-bit graphics data in the rs2 register, left shifts each 8-bit graphics data by 4 bits, and then zero-extend each left shifted graphics data to 16-bits. The results are correspondingly placed in the rd register. A FPMERGE instruction interleavingly merges four 8-bit graphics data from the rs1 register and four 8-bit graphics data from the rs2 register, into a 64 bit graphics datum in the rd register. As described earlier, the graphics data expand and merge instructions 210 are executed by the expand/merge portions of the graphics data expand/merge circuit 60 in the first independent execution path 32 of the GRU 28.

The graphics data logical operation instructions 214 include thirty-two logical operation instructions for performing logical operations on graphics data. Four logical operations are provided for zeroes filling or ones filling the rd register in either single or double precision. Four logical operation instructions are provided for copying the content of either the rs1 or rs2 register into the rd register in either single or double precision. Four logical operation instructions are provided for negating the content of either the rs1 or rs2 register and storing the result into the rd register in either single or double precision. Some logical operations are provided to perform a number of Boolean operations against the content of the rs1 and rs2 registers in either single or double precision, and storing the Boolean results into the rd register. Some of these Boolean operations are performed after having either the content of the rs1 or the rs2 register negated first. As described earlier, these graphics data logical operation instructions 214 are executed by the graphics data logical operation circuit 62 in the first independent execution path 32 of the GRU 28.

The graphics data compare instructions 216 include eight graphics data compare instructions for simultaneously comparing four pairs of 16-bit graphics data or two pairs of 32-bit graphics data. The comparisons between the graphics data in the rs1 and rs2 registers include greater than, less than, not equal, and equal. Four or two result bits are stored in the least significant bits in the rd register. Each result bit is set if the corresponding comparison is true. Complimentary comparisons between the graphics data, i.e., less than or equal to, and greater than or equal to, are performed by swapping the graphics data in the rs1 and rs2 registers. As described earlier, these graphics data compare instructions 216 are executed by the graphics data compare circuit 62 in the first independent execution path 32 of the GRU 28.

The graphics data memory reference instructions 222 include a partial (conditional) store, a short load, a short store, a block load and a block store instruction. The graphics data load and store instructions are qualified by the imm_asi and asi values to determine whether the graphics data load and store instructions 144 and 146 are to be performed simultaneously on 8-bit graphics data, 16-bit graphics data, and whether the operations are directed towards the primary or secondary address spaces in big or little endian format. For the store operations, the imm_asi and asi values further serve to determine whether the graphics data store operations are conditional.

A partial (conditional) store operation stores the appropriate number of values from the rd register to the addresses specified by the rs1 register using the mask specified (in the rs2 bit location). Mask has the same format as the results generated by the pixel compare instructions. The most significant bit of the mask corresponds to the most significant part of the rs1 register. A short 8-bit load operation may be performed against arbitrary byte addresses. For a short 16-bit load operation, the least significant bit of the address must be zero. Short loads are zero extended to fill the entire floating point destination register. Short stores access either the low order 8 or 16 bits of the floating point source register. A block load/store operation transfers data between 8 contiguous 64-bit floating point registers and an aligned 64-byte block in memory.

As described earlier, these graphics data memory reference instructions 222 are executed by the LSU 48 of the CPU 24.

The graphics data alignment instructions 204, the pixel distance computation instructions 206, the graphics data pack instructions 212, the edge handling instructions 218, and the 3-D array accessing instructions 220 will be described in further detail below in conjunction with the pixel distance computation circuit 56 and the graphics data pack circuit 59 in the second independent execution path 34 of the GRU 28.

Figure 7C:
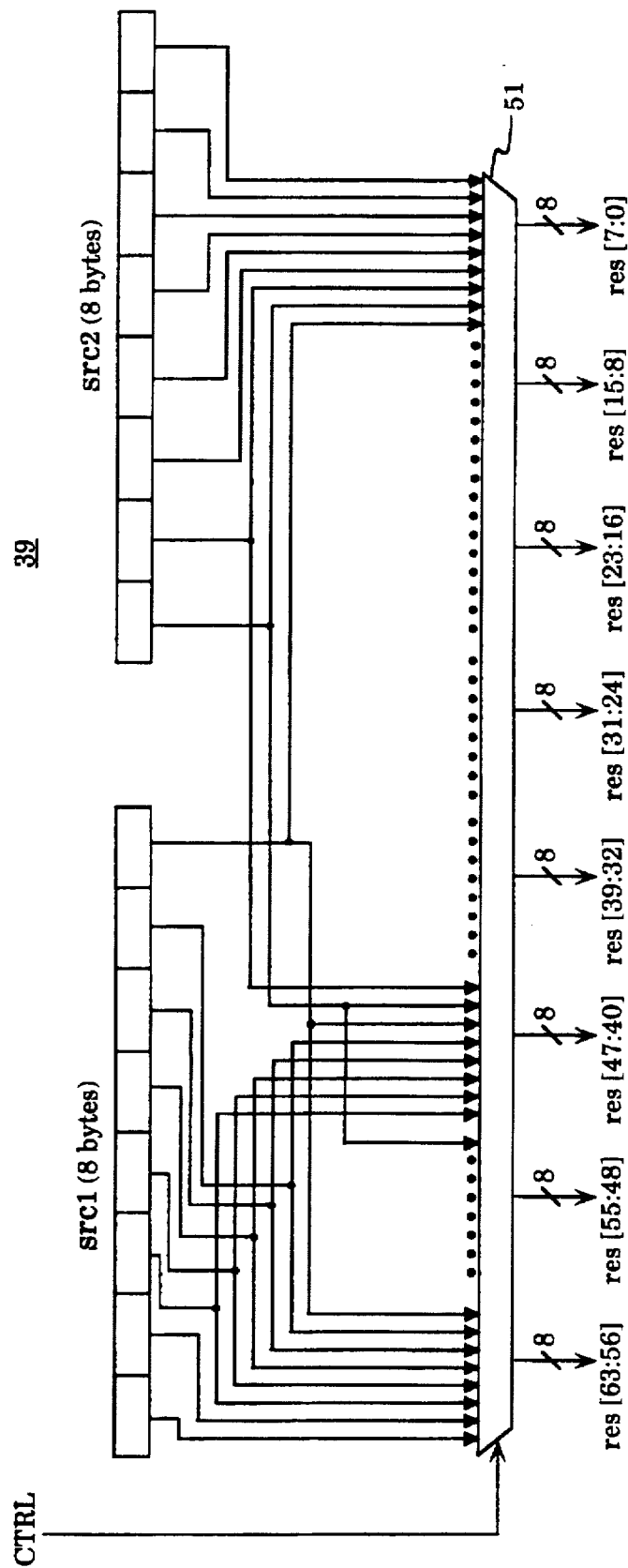

Referring now to FIGS. 7a–7c, the graphics data alignment instructions, and the relevant portions of one embodiment of the graphics data alignment circuit are illustrated. As shown in FIG. 7a, there are two graphics data address calculation instructions 98a–98b, and one graphics data alignment instruction 100 for calculating addresses of misaligned graphics data, and aligning misaligned graphics data.

The ALIGNADDR instruction 98a adds the content of the rs1 and rs2 registers, and stores the result, except the least significant 3 bits are forced to zeroes, in the rd register. The least significant 3 bits of the result are stored in the alignaddr_offset field of GSR 50. The ALIGNADDRL instruction 98b is the same as the alignaddr instruction 98a, except twos complement of the least significant 3 bits of the result is stored in the alignaddr_offset field of GSR 50.

The FALIGNDATA instruction 100 concatenates two 64-bit floating point values in the rs1 and rs2 registers to form a 16-byte value. The floating point value in the rs1 register is used as the upper half of the concatenated value, whereas the floating point value in the rs2 register is used as the lower half of the concatenated value. Bytes in the concatenated value are numbered from the most significant byte to the least significant byte, with the most significant byte being byte 0. Eight bytes are extracted from the concatenated value, where the most significant byte of the extracted value is the byte whose number is specified by the alignaddr_offset field of GSR 50. The result is stored as a 64 bit floating point value in the rd register.

Thus, as illustrated in FIG. 7b, by using the ALIGNADDRESS {_LITTLE} instruction to generate and store the alignaddr_offset in the GSR 50 (step a), copying the two portions of a misaligned graphics data block 99a–99b from memory into the rs1 and rs2 registers, aligning and storing the aligned graphics data block into the rd register using the FALIGNDATA instruction, and then copying the aligned graphics data block 101 from the rd register into a new memory location, a misaligned graphics data block 99a–99b can be aligned in a quick and efficient manner.

As shown in FIG. 7c, in this embodiment, the graphics data alignment circuit 39 comprises a 64-bit multiplexors 51, coupled to each other and the floating point register file as shown. The multiplexor 51 aligns misaligned graphics data as described above.

Referring now to FIGS. 8a–8g, the graphics data packing instructions, and the relevant portions of the packing portion of the graphics data pack/expand/merge circuit are illustrated. As illustrated in FIGS. 8a–8d, there are three graphics data packing instructions 106a–106c, for simultaneously packing four 16-bit graphics data into four 8-bit graphics data, two 32-bit graphics data into two 8-bit graphics data, and two 32-bit graphics data into two 16-bit graphics data.

The FPACK16 instruction 106a takes four 16-bit fixed values in the rs2 register, left shifts them in accordance to the scale_factor in GSR 50 and maintaining the clipping information, then extracts and clips 8-bit values starting at the corresponding immediate bits left of the implicit binary positions (between bit 7 and bit 6 of each 16-bit value). If the extracted value is negative (i.e., msb is set), zero is delivered as the clipped value. If the extracted value is greater than 255, 255 is delivered. Otherwise, the extracted value is the final result. The clipped values are correspondingly placed in the rd register.

The FPACK32 instruction 106b takes two 32-bit fixed values in the rs2 register, lefts shifts them in accordance to the scale_factor in GSR 50 and maintaining the clipping information, then extracts and clips 8-bit values starting at the immediate bits left of the implicit binary positions (i.e., between bit 23 and bit 22 of a 32-bit value). For each extracted value, dipping is performed in the same manner as described earlier. Additionally, the FPACK32 instruction 106b left shifts each 32-bit value in the rs1 register by 8 bits. Finally, the FPACK32 instruction 106b correspondingly merges the clipped values from the rs2 register with the shifted values from the rs2 register, with the clipped values occupying the least significant byte positions. The resulting values are correspondingly placed in the rd register.

The FPACKFIX instruction 106c takes two 32-bit fixed values in the rs2 register, left shifts each 32-bit value in accordance to the scale_factor in GSR 50 maintaining the clipping information, then extracts and clips 16-bit values starting at the immediate bits left of the implicit binary positions (i.e., between bit 16 and bit 15 of a 32-bit value). If the extracted value is less than −32768, −32768 is delivered as the clipped value. If the extracted value is greater than 32767, 32767 is delivered. Otherwise, the extracted value is the final result. The clipped values are correspondingly placed in the rd register.

Figures 8A, 8B:
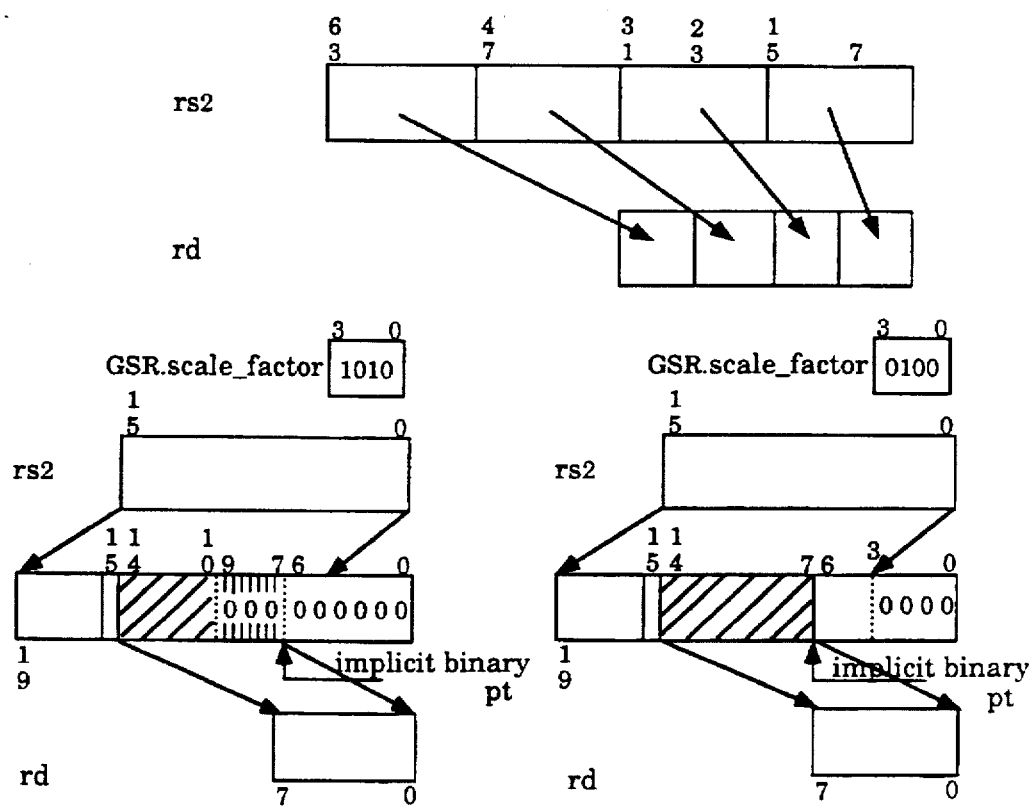
FIGS. 8a–8g illustrate the graphics data packing instructions and circuitry in further detail.
Figure 8C:
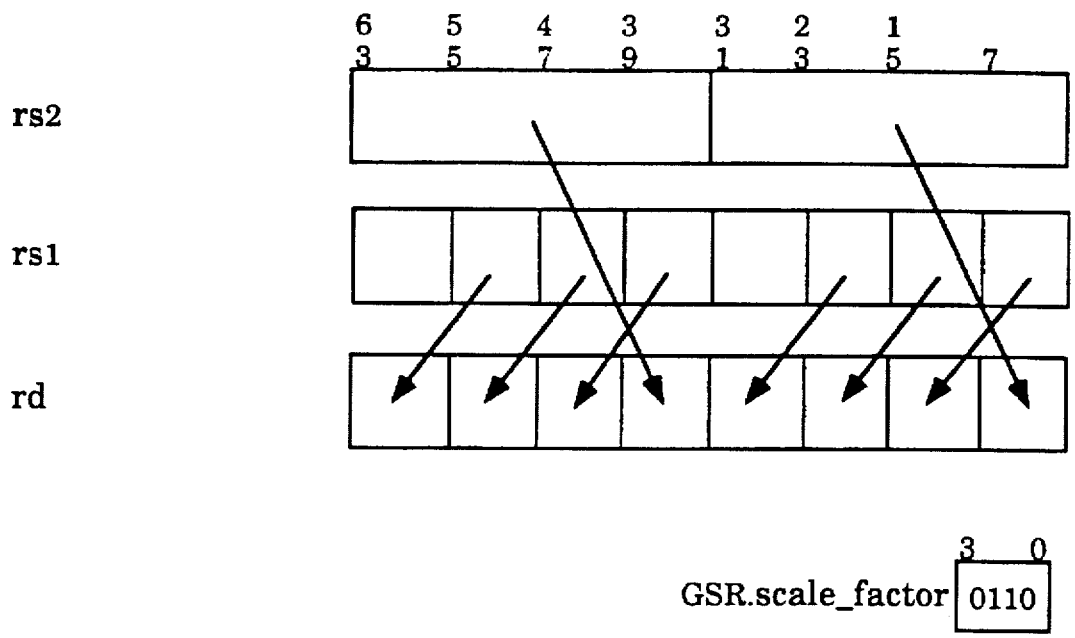
Figure 8C:
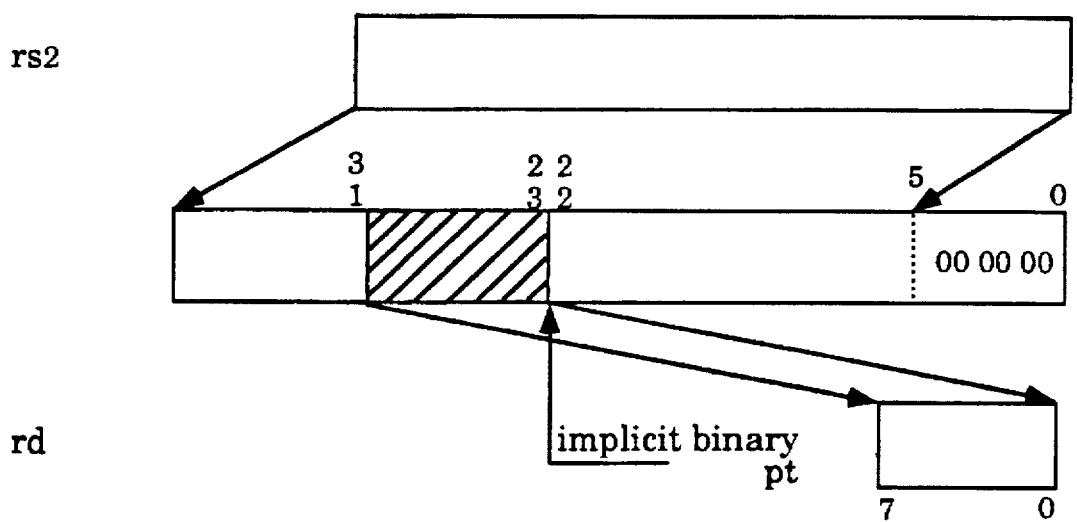
Figure 8D:
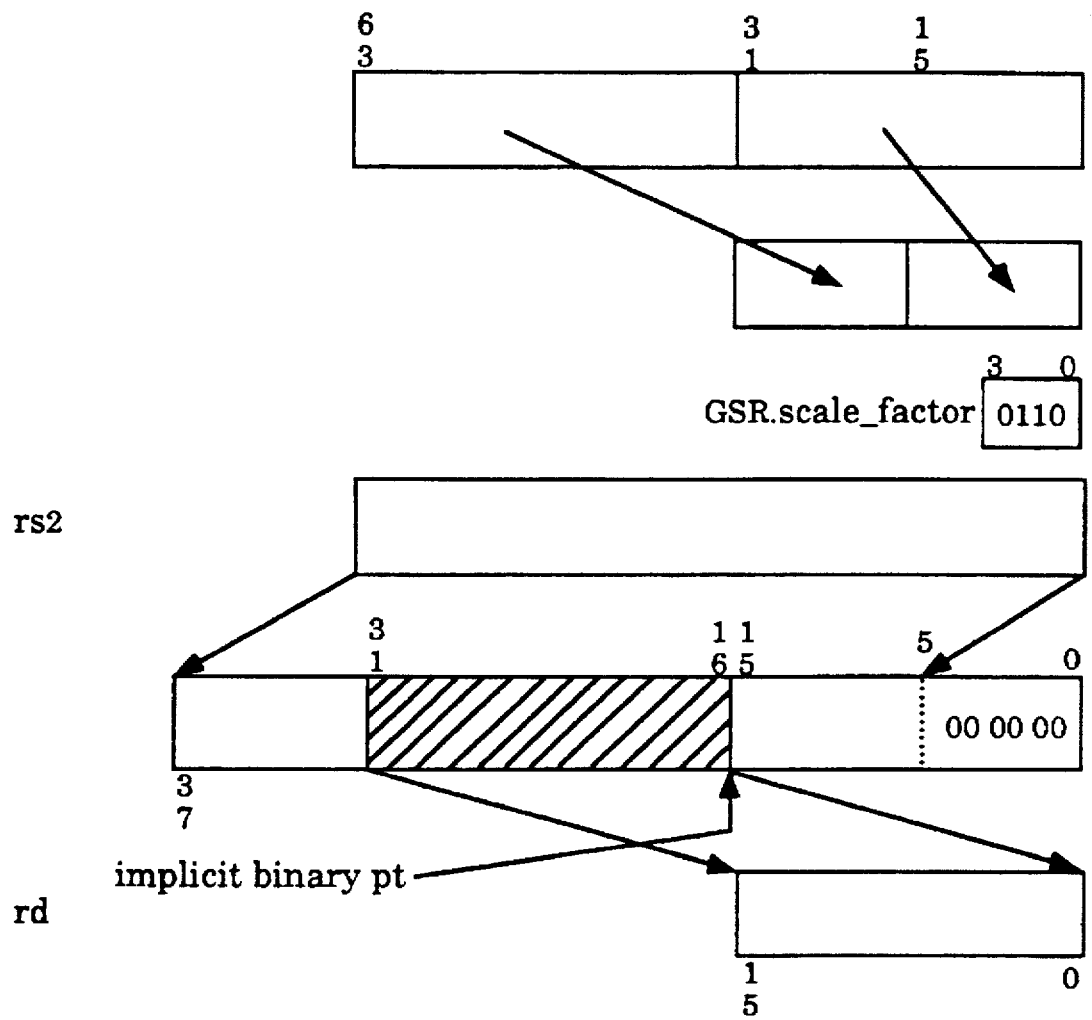
Figure 8E:
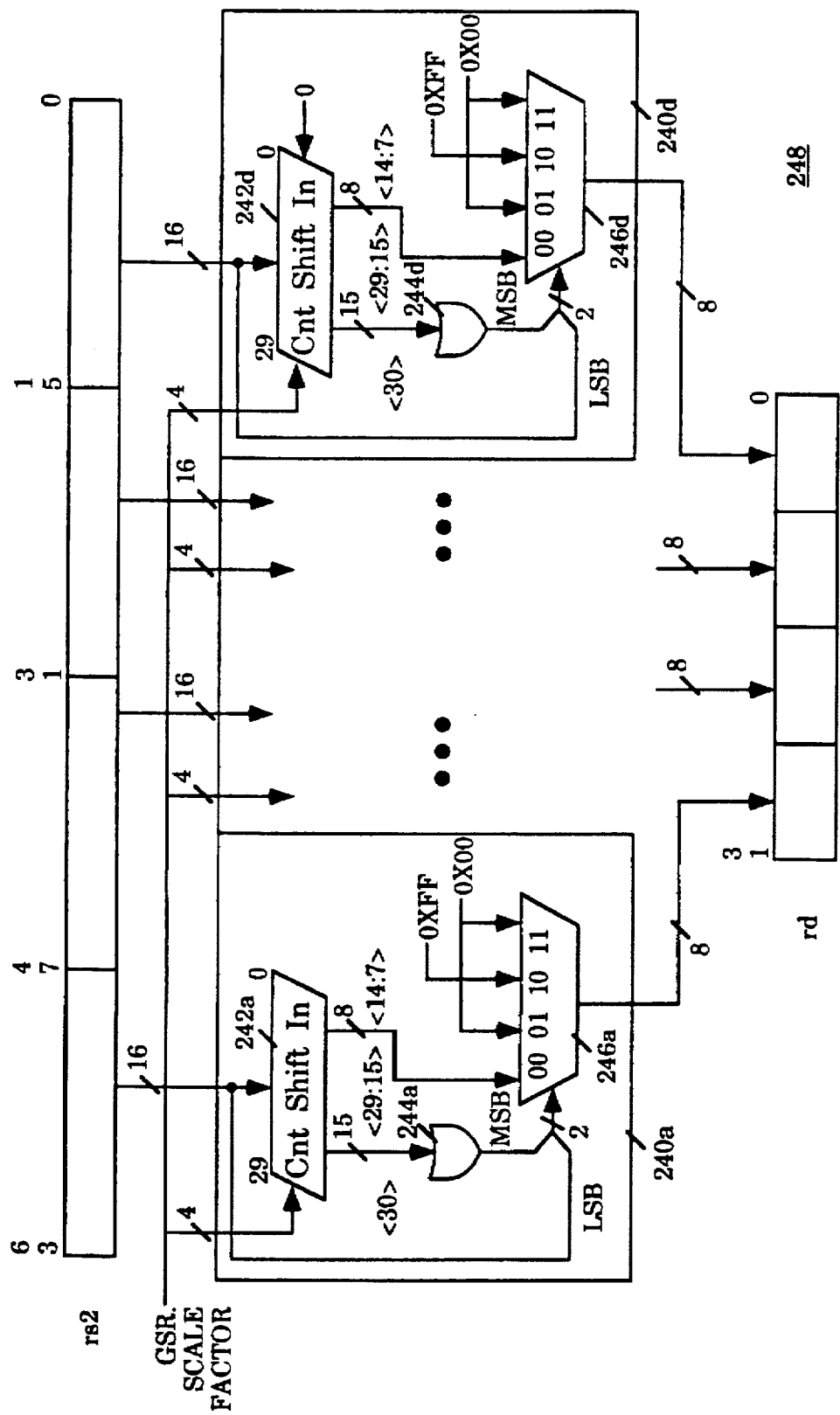
Figure 8F:
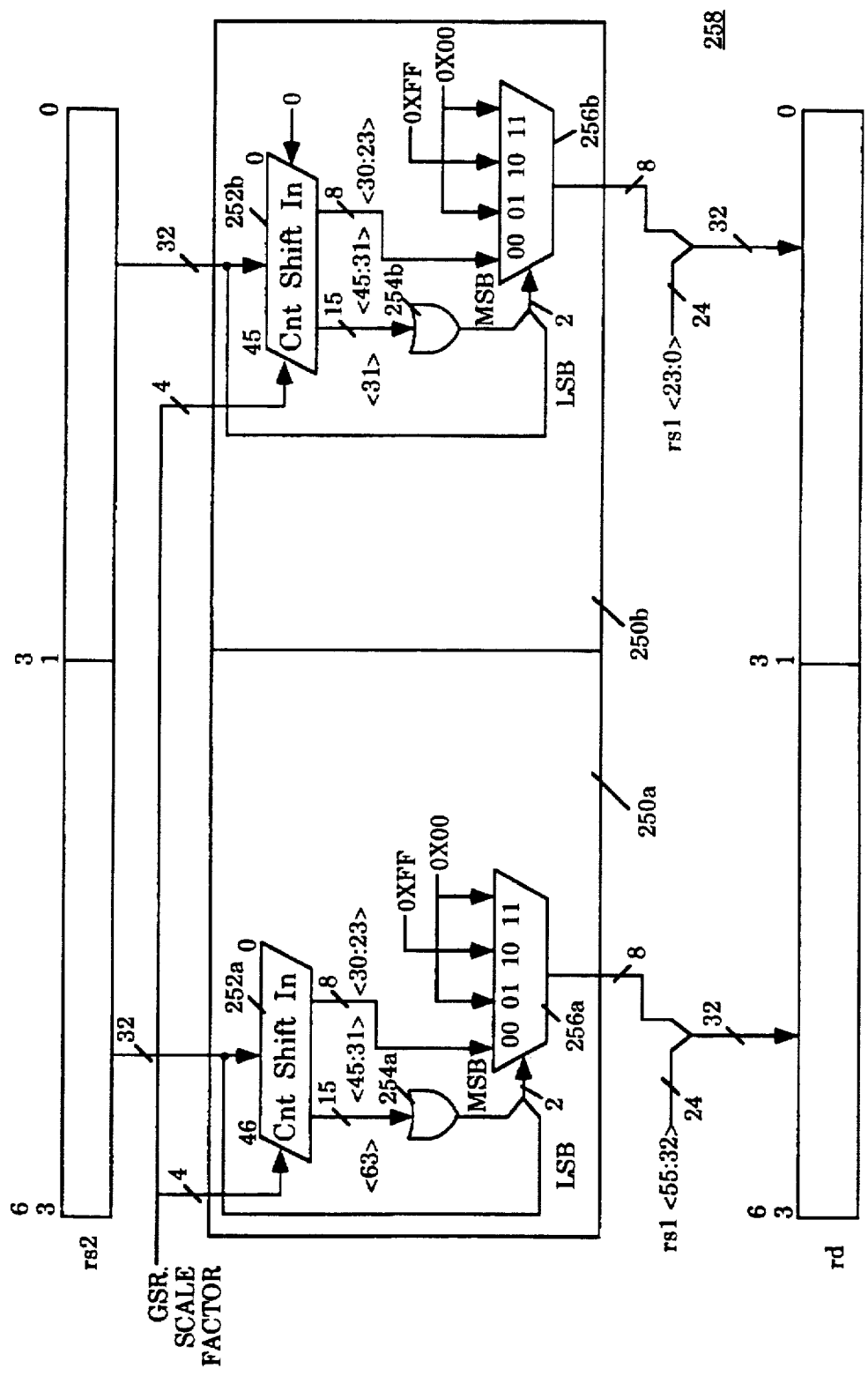
Figure 8G:
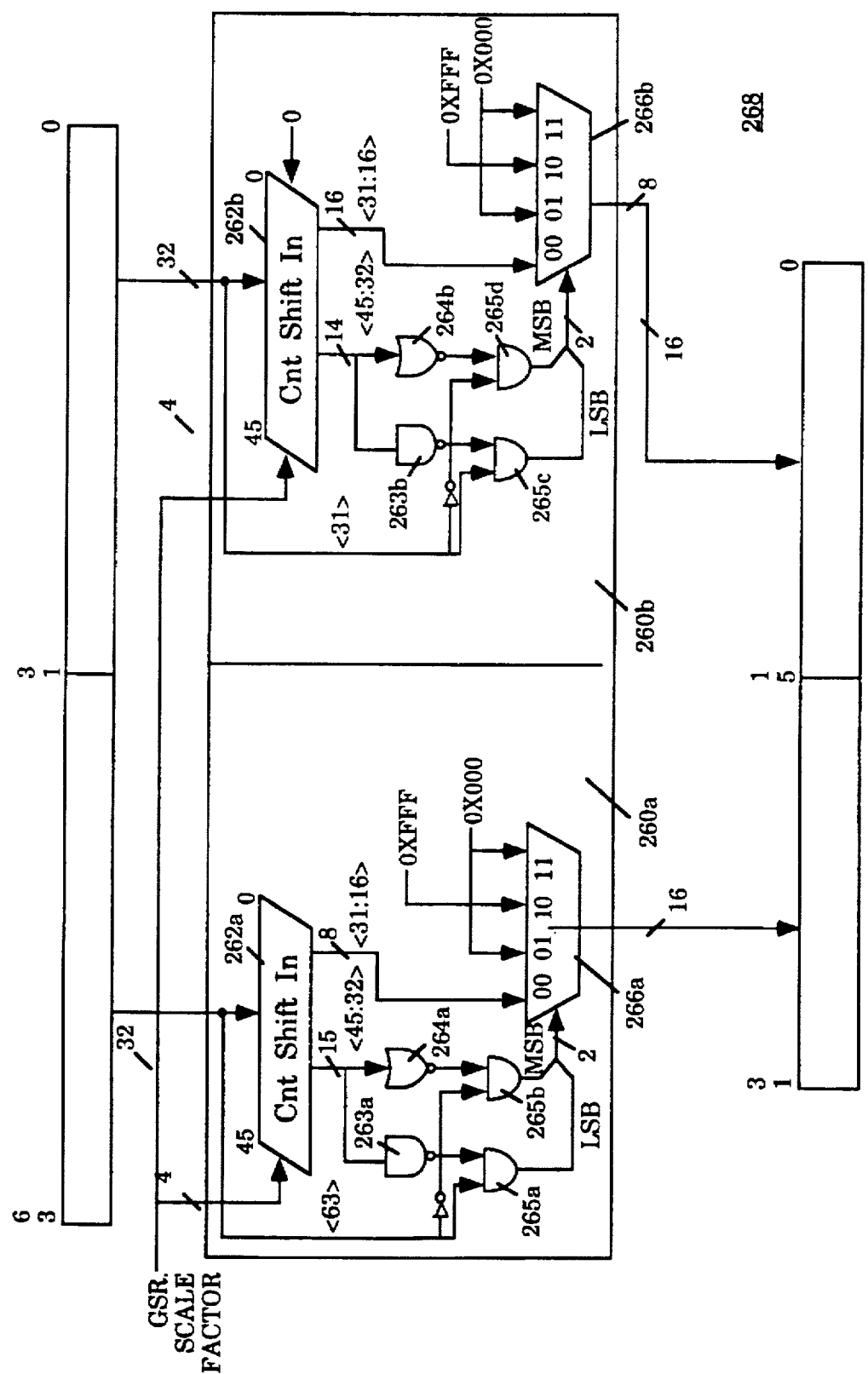

As illustrated in FIGS. 8e–8g, in this embodiment, the graphics data packing circuit 59 comprises circuitry 248, 258 and 268 for executing the FPACK16, FPACK32, and FPACKFIX instructions respectively.

The circuitry 248 for executing the FPACK16 instruction comprises four identical portions 240a–240d, one for each of the four corresponding 16-bit fixed values in the rs2 register. Each portion 240a or 240d comprises a shifter 42a, ... or 242d, an OR gate 244a, ... or 244d, and a multiplexor 246a, ... or 246d, coupled to each other as shown. The shifter 242a, ... or 242d shifts the corresponding 16-bit fixed value (excluding the sign bit) according to the scale factor stored in the GSR 50. The sign bit and the logical OR of bits [29:15] of each of the shift results are used to control the corresponding multiplexor 246a, ... or 246d. Either bits [14:7] of the shift result, the value 0xFF or the value 0x00 are output.

The circuitry 258 for executing the FPACK32 instruction comprises two identical portions 250a–250b, one for each of the two corresponding 32-bit fixed values in the rs2 register. Each portion 250a or 250b also comprises a shifter 252a or 252d, an OR gate 254a or 254b, and a multiplexor 256a or 256b, coupled to each other as shown. The shifter 252a or 252d shifts the corresponding 32-bit fixed value (excluding the sign bit) according to the scale factor stored in the GSR 50. The sign bit and the logical OR of bits [45:31] of each of the shift results are used to control the corresponding multiplexor 256a or 256b. Either bits [30:23] of the shift result, the value 0xFF or the value 0x00 are output. The output is further combined with either bits [55:32] or bits [23:0] of the rs1 register.

The circuitry 268 for executing the FPACKFIX instruction also comprises two identical portions 260a–260b, one for each of the two corresponding 32-bit fixed values in the rs2 register. Each portion 260a or 260b also comprises a shifter 262a or 262d, a NAND gate 263a or 263b, a NOR gate 264a or 264b, two AND gates 265a–265b or 265c–265d, and a multiplexor 266a or 266b, coupled to each other as shown. The shifter 262a or 262d shifts the corresponding 32-bit fixed value (excluding the sign bit) according to the scale factor stored in the GSR 50. The logical AND of the sign bit and the logical NAND of bits [45:32] of each of the shift results, and the logical AND of the inverted sign bit and the logical NOR of bits [45:32] of each of the shift results, are used to control the corresponding multiplexor 266a or 266b. Either bits [31:16] of the shift result, the value 0xEFFF or the value 0x8000 are output.

Figure 9B:
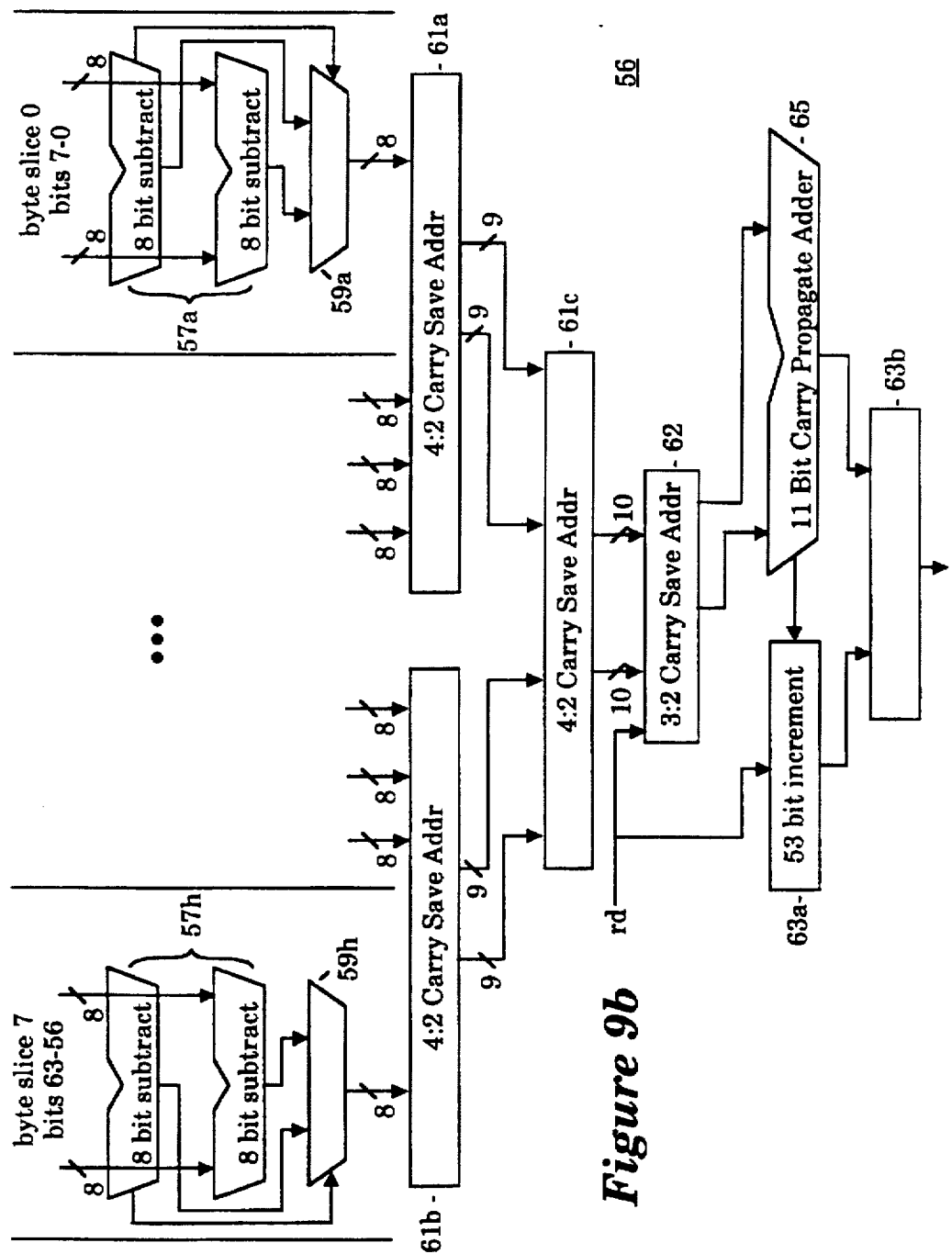

Referring now to FIGS. 9a–9b, the pixel distance computation instructions, and the pixel distance computation circuit are illustrated. As shown in FIG. 9a, there is one graphics data distance computation instruction 138 for simultaneously accumulating the absolute differences between graphics data, eight pairs at a time. The PDIST instruction 138 subtracts eight 8-bit graphics data in the rs1 register from eight corresponding 8-bit graphics data in the rs2 register. The sum of the absolute values of the differences is added to the content of the rd register. The PDIST instruction is typically used for motion estimation in video compression algorithms.

As shown in FIG. 9b, in this embodiment, the pixel distance computation circuit 56 comprises eight pairs of 8 bit subtractors 57a–57h. Additionally, the pixel distance computation circuit 56 further comprises three 4:2 carry save adders 61a–61c, a 3:2 carry save adder 62, two registers 63a–63b, and a 11-bit carry propagate adder 65, coupled to each other as shown. The eight pairs of 8 bit subtractors 57a–57h, the three 4:2 carry save adders 61a–61c, the 3:2 carry save adder 62, the two registers 63a–63b, and the 11-bit carry propagate adder 65, cooperate to compute the absolute differences between eight pairs of 8-bit values, and aggregate the absolute differences into a 64-bit sum.

Referring now to FIG. 10a–10b, the graphics data edge handling instructions are illustrated. As illustrated, there are six graphics edge handling instructions 140a–140f, for simultaneously generating eight 8-bit edge masks, four 16-bit edge masks, and two 32-bit edge masks in big or little endian format.

The masks are generated in accordance to the graphics data addresses in the rs1 and rs2 registers, where the addresses of the next series of pixels to render and the addresses of the last pixels of the scan line are stored respectively. The generated masks are stored in the least significant bits of the rd register.

Each mask is computed from the left and right edge masks as follows:

a) The left edge mask is computed from the 3 least significant bits (LSBs) of the rs1 register, and the right edge mask is computed from the 3 (LSBs) of the rs2 register in accordance to FIG. 10b.

b) If 32-bit address masking is disabled, i.e. 64-bit addressing, and the upper 61 bits of the rs1 register are equal to the corresponding bits of the rs2 register, then rd is set equal to the right edge mask ANDed with the left edge mask.

c) if 32-bit address masking is enabled, i.e. 32-bit addressing, and the upper 29 bits ([26:2]) the rs1 register are equal to the corresponding bits of the rs2 register, then the rd register is set to the right edge mask ANDed with the left edge mask.

d) Otherwise, rd is set to the left edge mask.

Additionally, a number of conditions codes are modified as follows:

a) a 32-bit overflow condition code is set if bit 31 (the sign) of rs1 and rs2 registers differ and bit 31 (the sign) of the difference differs from bit 31 (the sign) of rs1; a 64-bit overflow condition code is set if bit 63 (the sign) of rs1 and rs2 registers differ and bit 63 (the sign) of the difference differs from bit 63 (the sign) of rs1.

b) a 32-bit negative condition code is set if bit 31 (the sign) of the difference is set; a 64-bit negative condition code is set if bit 63 (the sign) of the difference is set.

c) a 32-bit zero condition code is set if the 32-bit difference is zero; a 64-bit zero condition code is set if the 64-bit difference is zero.

As described earlier, the graphics edge handling instructions 140a–140f are executed by the IEU 30. No additional hardware is required by IEU 30.

Figure 11B:
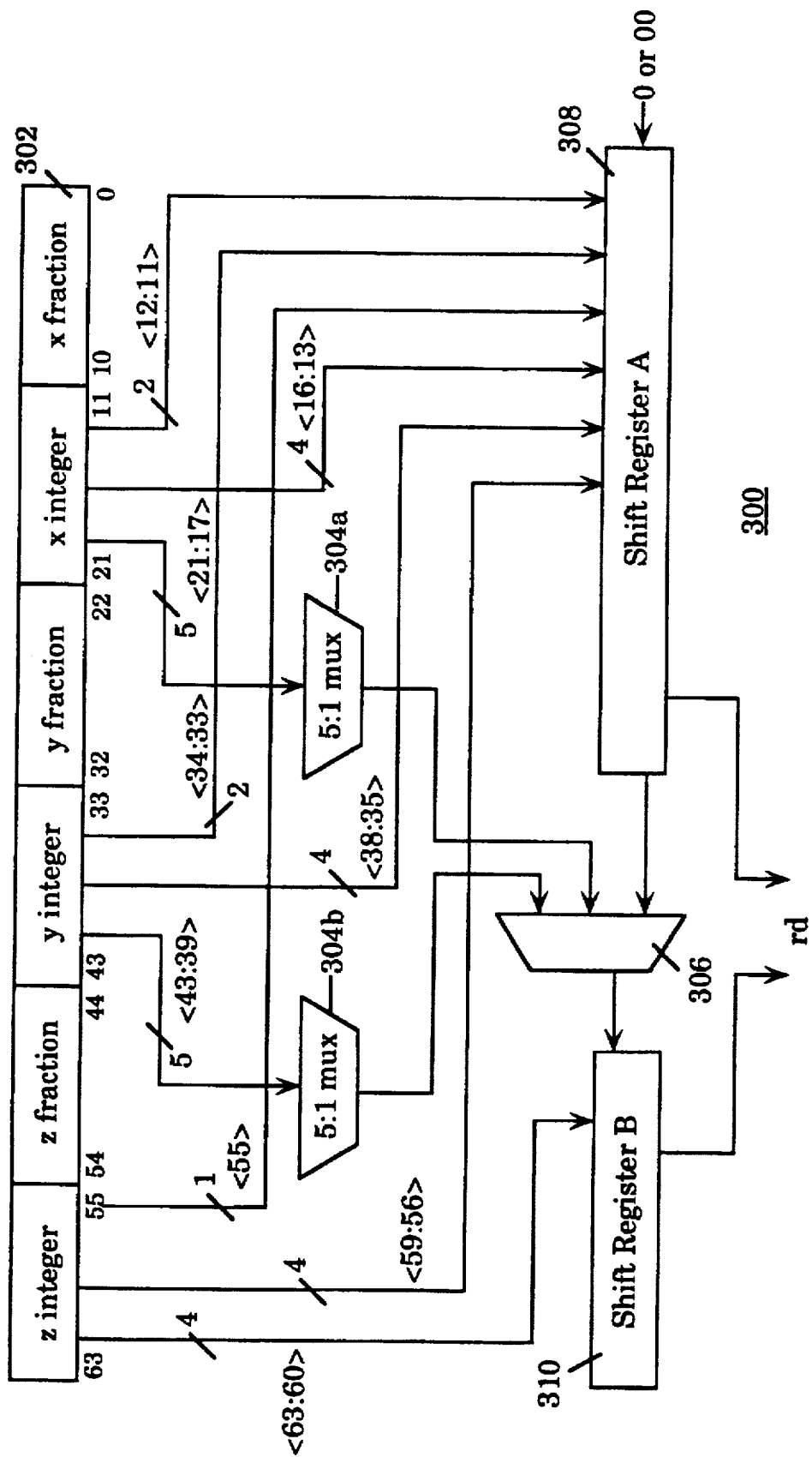

Referring now to FIGS. 11a–11b, the 3-D array addressing instructions and circuitry are illustrated. As illustrated in FIG. 11a, there are three 3-D array addressing instructions 142a–142c for converting 8-bit, 16-bit, and 32-bit 3-D addresses to blocked byte addresses.

Each of these instructions 142a–142c converts 3-D fixed point addresses in the rs1 register to a blocked byte address, and store the resulting blocked byte address in the rd register. These instructions 142a–142c are typically used for address interpolation for planar reformatting operations.

Blocking is performed at the 64-byte level to maximize external cache block reuse, and at the 64 k-byte level to maximize the data cache's translation lookaside buffer (TLB) entry reuse, regardless of the orientation of the address interpolation. The element size, i.e., 8-bits, 16-bits, or 32-bit, is implied by the instruction. The value of the rs2 register specifies the power of two sizes of the X and Y dimension of a 3D image array. In the embodiment illustrated, the legal values are from zero to five. A value of zero specifies 64 elements, a value of one specifies 128 elements, and so on up to 2048 elements for the external cache block size specified through the value of five. The integer parts of X, Y, and Z (rs1) are converted to either the 8-bit, the 16-bit, or the 32-bit format. The bits above Z upper are set to zero. The number of zeros in the least significant bits is determined by the element size. An element size of eight bits has no zero, an element size of 16-bits has one zero, and an element size of 32-bits has two zeroes. Bits in X and Y above the size specified by the rs2 register is ignored.

As described earlier, the 3-D array addressing instructions 142a–140c are also executed by the IEU 30. FIG. 11b illustrates one embodiment of the additional circuitry provided to the IEU 30. The additional circuitry 300 comprises two shift registers 308 and 310, and a number of multiplexors 304a–304b and 306, coupled to each other as shown. The appropriate bits from the lower and middle integer portions of X, Y, and Z (i.e. bits <12:11>, <34:33>, <55>, <16:13>, <38:35>, and <59:56>) are first stored into shift register A 308. Similarly, the appropriate bits of the upper integer portion of Z (i.e. <63:60>) are stored into shift register B 310. Then, selected bits of the upper integer portions of Y and X are shifted into shift register B 310 in order, depending on the value of rs2. Finally, zero, one, or two zero bits are shifted into shift register A 308, with the shift out bits shifted into shift register B 310, depending on the array element size (i.e. 8, 16, or 32 bits).

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative of, and not limiting the scope of the present invention.

What is claimed is:

1. An apparatus, comprising:

a register file including a first and a second register for storing a first and a second plurality of graphics data, and a third register for storing a pixel distance value; and pixel distance computation circuitry coupled to the register file, including a plurality of subtractor assemblies coupled in parallel to an hierarchy of carry save adders, for executing a pixel distance computation instruction, said pixel distance computation instruction simultaneously computing absolute differences of the first and second plurality of graphic data using the subtractor assemblies, and accumulating their absolute differences into the third register to form the pixel distance value using the carry save adders.

2. The apparatus as set forth in claim 1, wherein said pixel distance computation circuitry is disposed in a graphics execution unit (GRU).

3. The apparatus as set forth in claim 2, wherein said apparatus further comprises:

a floating pointer register file (FPRF) coupled to said GRU for storing floating point and graphics data; and a floating point execution unit (FPU) coupled to said FPRF for executing a plurality of non-graphics floating point instructions.

4. An apparatus, comprising:

a register file including a first and a second register for storing a first and a second plurality of graphics data addresses respectively, and a third register for storing a plurality of edge masks; and an integer execution unit (IEU) coupled to the register file for executing a graphics data edge handling instruction the graphics data edge handling instruction simultaneously generating and storing the edge masks in the third register, using the contents of the first and second registers, each mask being generated by conditionally performing a logical AND operation against a first and a second intermediate edge mask, depending on how a first and a second plurality of corresponding higher order bits of the first and second registers compare to each other, the first and second intermediate edge masks being generated in accordance to a first and a second plurality of corresponding lower order bits of the first and second registers.

5. The apparatus as set forth in claim 4, wherein, said IEU further executes a plurality of graphics data three-dimensional (3-D) array addressing instructions, each of said graphics data 3-D array addressing instructions converts multiple 3-D graphics data array fixed point addresses to a blocked byte address.

6. The apparatus as set forth in claim 4, wherein said apparatus further comprises:

a integer register file (IRF) coupled to said IEU for storing integer and graphics data addresses.

7. An apparatus, comprising:

a register file including a first register for storing an encoded value, a second register for storing a plurality of 3-D fixed point addresses, and a third register for storing a blocked byte address; and an integer execution unit (IEU) coupled to the register file for executing a graphics data three-dimensional (3-D) array addressing instruction the graphics data 3-D array addressing instruction generating and storing the blocked byte address in the third register using the encoded value and the 3-D fixed point addresses in the first and second registers, the blocked byte address being generated by concatenating a first and a second intermediate value, which are generated from various predetermined portions of the 3-D fixed point addresses.

8. An apparatus, comprising:

a floating pointer register file (FPRF) for storing floating point and graphics data;

a integer register file (IRF) for storing integer and graphics data addresses;

a floating point execution unit (FPU) coupled to said FPRF for executing a plurality of non-graphics floating point instructions;

an integer execution unit (IEU) coupled to said IRF for executing a plurality of non-graphics integer instructions, a plurality of graphics data edge handling instructions, and a plurality of graphics data three-dimensional (3-D) array addressing instructions, each of said graphics data edge handling instructions simultaneously generating multiple edge masks for multiple pairs of graphics data addresses, and each of said graphics data 3-D array addressing instructions converts multiple 3-D graphics data array fixed point addresses to a blocked byte address; and a graphics execution unit (GRU) coupled to said FPRF for executing a plurality of graphics data conversion instructions, a plurality of graphics data misaligned address calculation instructions, a plurality of graphics data alignment instructions, and a pixel distance computation instruction, each of said graphics data conversion instructions simultaneously packing multiple graphics data from a first partitioned graphics data format to a second partitioned graphics data format, scaling shifting and clipping operations in accordance to a scaling factor, each of said graphics data misaligned address calculation instructions calculating an address of a block of misaligned graphics data and an address alignment offset, each of said graphics data alignment instructions aligning a block of misaligned graphics data in accordance to an address alignmnent offset, and said pixel distance computation instruction simultaneously computing absolute differences of multiple pairs of graphic data and accumulating their absolute differences.

9. A method of executing graphics instructions by a central processing unit (CPU), comprising the step of:

executing a graphics data edge handling instruction by simultaneously generate multiple edge masks for multiple pairs of graphics data addresses, using a register file and an integer execution unit (IEU) coupled to each other, and disposed on said CPU, the register file including a first and a second register for storing the graphics data addresses, and a third register for storing the edge masks, each mask being generated by conditionally performing a logical AND operation against a first and a second intermediate edge mask, depending on how a first and a second plurality of corresponding higher order bits of the first and second registers compare to each other, the first and second intermediate edge masks being generated in accordance to a first and a second plurality of corresponding lower order bits of the first and second registers.

10. The method as set forth in claim 9, wherein, said method further comprises the step of executing a plurality of graphics data three-dimensional (3-D) array addressing instructions to convert multiple 3-D graphics data array fixed point addresses to a blocked byte address using said IEU.

11. A method of executing graphics instructions by a central processing unit (CPU), comprising the step of executing a graphics data three-dimensional (3-D) array addressing instruction to convert multiple 3-D graphics data array fixed point addresses to a blocked byte address using a register file and an integer execution unit (IEU) coupled to each other and disposed on said CPU, the register file including a first register for storing an encoded value, a second register for storing the fixed point addresses, and a third register for storing the blocked byte address, the blocked byte address being generated by concatenating a first and a second intermediate value, which are generated from various predetermined portions of the fixed point addresses.

12. A method of executing graphics instructions by a central processing unit (CPU), comprising the steps of:

storing a scaling factor for graphics data in a graphics status register (GSR) disposed in said CPU;

executing a plurality of graphics data packing instructions to pack multiple graphics data from a first partitioned graphics data format to a second partitioned graphics data format, scaling shifting and clipping operations in accordance to said stored scaling factor using dedicated graphics data conversion circuitry disposed in said CPU;

executing a plurality of graphics data misaligned address calculation instructions to calculate an address of a block of misaligned graphics data and an address alignment offset using dedicated graphics data alignment circuitry disposed in said CPU, said address alignment offset being stored into said GSR;

executing a plurality of graphics data alignment instructions to align a block of misaligned graphics data in accordance to said stored address alignment offset using said dedicated graphics data alignment circuitry;

executing a pixel distance computation instruction to simultaneously compute absolute differences of multiple pairs of graphics data and accumulate their absolute differences using dedicated pixel distance computation circuitry disposed in said CPU;

executing a plurality of graphics data edge handling instructions to simultaneously generate multiple edge masks for multiple pairs of graphics data addresses using an integer execution unit (IEU) disposed on said CPU; and executing a plurality of graphics data three-dimensional (3-D) array addressing instructions to convert multiple 3-D graphics data array fixed point addresses to a blocked byte address using said IEU.

13. A method of providing native graphics capabilities to a central processing unit (CPU), comprising the steps of:

providing a graphics status register (GSR) in said CPU for storing a scaling factor for graphics data;

providing dedicated graphics data conversion circuitry in said CPU for executing a plurality of graphics data packing instructions to pack multiple graphics data from a first partitioned graphics data format to a second partitioned graphics data format, scaling shifting and clipping operations in accordance to said stored scaling factor;

providing dedicated graphics data alignment circuitry in said CPU for executing a plurality of graphics data misaligned address calculation instructions to calculate an address of a block of misaligned graphics data and an address alignment offset, said address alignment offset being stored into said GSR;

providing circuitry to said dedicated graphics data alignment circuitry for executing a plurality of graphics data alignment instructions to align a block of misaligned graphics data in accordance to said stored address alignment offset;

providing dedicated pixel distance computation circuitry disposed in said CPU for executing a pixel distance computation instruction to simultaneously compute absolute differences of multiple pairs of graphics data and accumulate their absolute differences;

providing circuitry to an integer execution unit (IEU) in said CPU for executing a plurality of graphics data edge handling instructions to simultaneously generate multiple edge masks for multiple pairs of graphics data addresses; and providing circuitry to said IEU for executing a plurality of graphics data three-dimensional (3-D) array addressing instructions to convert multiple 3-D graphics data array fixed point addresses to a blocked byte address.

14. In a computer system comprising a memory unit for storing nongraphics and graphics instructions and data, and a central processing unit (CPU) coupled to said memory unit having a floating point register file (FPRF) for storing floating point and graphics data, a floating point execution unit (FPU) for executing floating point operations of said non-graphics instructions, and a load and store unit (LSU) for loading and storing graphics data to and from said FPRF and said memory unit, an apparatus for aligning a block of misaligned graphics data, said apparatus comprising:

a) graphics status register (GSR) means integrated with said CPU for storing an address alignment offset for graphics data, said graphics data being organized and stored in said FPRF and said memory unit in a plurality of partitioned formats; and (b) graphics data alignment means integrated with said CPU and coupled to said FPRF, and said GSR means for executing a plurality of graphics data misaligned address calculation instructions, and a plurality of graphics data alignment instructions of said graphics instructions, each of said graphics data misaligned address calculation instructions calculating an address of a block of misaligned graphics data and an address alignment offset, said block of misaligned graphics data being loaded into said FPRF from said memory unit using said LSU, each of said graphics data alignment instructions aligning a block of misaligned graphics data stored in said FPRF in accordance to said stored address alignment offset, said aligned block of graphics data being stored back into said memory unit from said FPRF using said LSU.

15. In a computer system comprising a memory unit for storing non-graphics and graphics instructions and data, and a central processing unit (CPU) coupled to said memory unit having a floating point register file (FPRF) for storing floating point and graphics data, a floating point execution unit (FPU) for executing floating point operations of said non-graphics instructions, and a load and store unit (LSU) for loading and storing graphics data to and from said FPRF and said memory unit, a method for aligning a block of misaligned graphics data, said method comprising the steps of:

a) loading a block of misaligned graphics data into said FPRF from said memory unit using said LSU;

b) calculating alignment address and alignment address offset of said block of misaligned graphics data, and storing said calculated alignment address offset into a graphics status register (GSR) independent of said FPRF, using graphics data alignment means integrated with said CPU but independent of said FPU;

c) aligning said block of misaligned graphics data in accordance to said calculated alignment address and said stored alignment address offset using said graphics data alignment means independent of said FPU;

d) storing said aligned block of graphics data back into said memory unit from said FPRF using said LSU.

* * * * *